United States Patent
Mori et al.

(10) Patent No.: US 9,647,479 B2
(45) Date of Patent: *May 9, 2017

(54) CHARGING SYSTEM INCLUDING A BATTERY PACK THAT OUTPUTS A STOP REQUEST SIGNAL AND A CHARGING APPARATUS THAT STOPS POWER CONVERSION IN RECEIPT OF THE STOP REQUEST SIGNAL

(71) Applicant: MAKITA CORPORATION, Anjo-shi, Aichi (JP)

(72) Inventors: Tatsuki Mori, Anjo (JP); Toru Yamada, Anjo (JP); Shinichi Hira, Anjo (JP); Hitoshi Suzuki, Anjo (JP)

(73) Assignee: MAKITA CORPORATION, Anjo-Shi (JP)

(*) Notice: Subject to any disclaimer, the term of this patent is extended or adjusted under 35 U.S.C. 154(b) by 116 days.

This patent is subject to a terminal disclaimer.

(21) Appl. No.: 14/519,684

(22) Filed: Oct. 21, 2014

(65) Prior Publication Data

US 2015/0035488 A1 Feb. 5, 2015

Related U.S. Application Data

(63) Continuation of application No. 12/385,550, filed on Apr. 10, 2009, now Pat. No. 8,890,481.

(30) Foreign Application Priority Data

Apr. 15, 2008 (JP) .................................. 2008-105775

(51) Int. Cl.
*H02J 7/00* (2006.01)
*G06F 11/07* (2006.01)
(Continued)

(52) U.S. Cl.
CPC .......... *H02J 7/007* (2013.01); *G05B 19/0428* (2013.01); *G05B 19/058* (2013.01);
(Continued)

(58) Field of Classification Search
CPC ........ H02J 7/0047; H02J 7/0093; H02J 7/007; H02J 7/0029; H02J 7/027; H02J 7/0021;
(Continued)

(56) References Cited

U.S. PATENT DOCUMENTS 5,014,214 A 5/1991 Glowczewski et al.
5,737,163 A 4/1998 Newlin
(Continued)

FOREIGN PATENT DOCUMENTS

JP A 7-141066 6/1995
JP A 2003-299260 10/2003
(Continued)

*Primary Examiner* — Richard Isla Rodas
*Assistant Examiner* — Manuel Hernandez
(74) *Attorney, Agent, or Firm* — Oliff PLC

(57) ABSTRACT

A charging control device includes a control unit and a monitoring unit. The control unit performs at least one of controlling charging to a rechargeable battery and monitoring a state of a rechargeable battery, while outputting a state signal which indicates an operation state of the control unit. The monitoring unit determines whether or not the operation state of the control unit is a predesignated specified operation state based on the state signal outputted from the control unit.

5 Claims, 8 Drawing Sheets

(51) Int. Cl.
*G05B 19/05* (2006.01)
*G05B 19/042* (2006.01)
*H02J 7/02* (2016.01)

(52) U.S. Cl.
CPC ........ *G06F 11/076* (2013.01); *G06F 11/0757* (2013.01); *H02J 7/0021* (2013.01); *H02J 7/0029* (2013.01); *H02J 7/0047* (2013.01); *H02J 7/0093* (2013.01); *H02J 7/027* (2013.01); *G05B 2219/14086* (2013.01); *G05B 2219/24125* (2013.01); *G05B 2219/25158* (2013.01)

(58) Field of Classification Search
CPC . G06F 11/0757; G06F 11/076; G05B 19/058; G05B 19/0428; G05B 2219/14086; G05B 2219/25158; G05B 2219/24125
USPC .......................................................... 320/112
See application file for complete search history.

(56) References Cited

U.S. PATENT DOCUMENTS

| | | | |
|---|---|---|---|
| 6,859,013 | B2 | 2/2005 | Howard et al. |
| 7,112,942 | B2 | 9/2006 | Howard et al. |
| 7,221,124 | B2 | 5/2007 | Howard et al. |
| 8,890,481 | B2 * | 11/2014 | Mori ..................... H02J 7/0047 320/134 |
| 2004/0095109 | A1 | 5/2004 | Kernahan |
| 2005/0077878 | A1 | 4/2005 | Carrier et al. |
| 2005/0242779 | A1 | 11/2005 | Yoshio |
| 2010/0085020 | A1 * | 4/2010 | Suzuki ..................... B25F 5/00 320/157 |

FOREIGN PATENT DOCUMENTS

| | | |
|---|---|---|
| JP | A 2006-288090 | 10/2006 |
| JP | A 2009-124883 | 6/2009 |

* cited by examiner

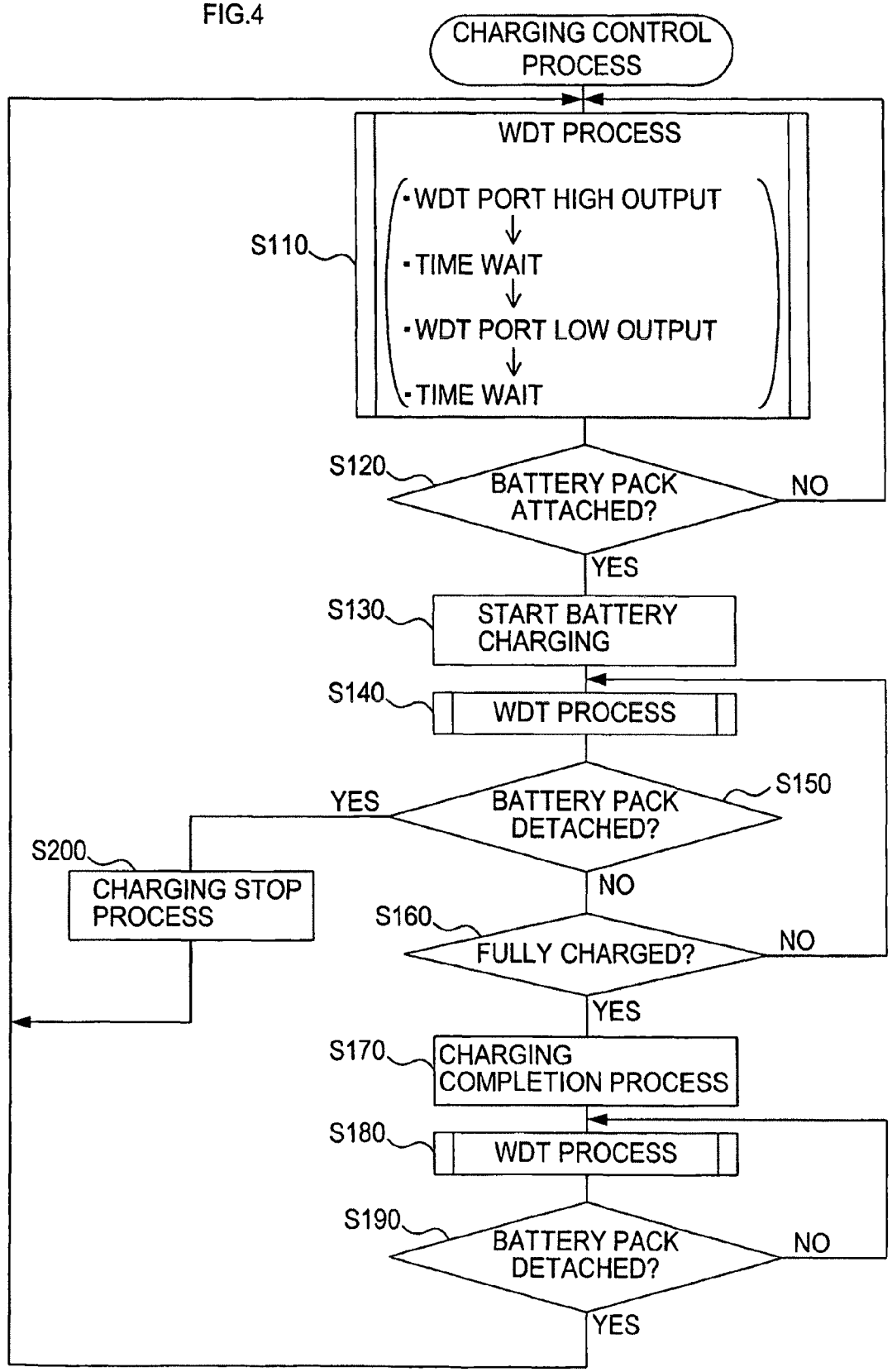

CHARGING SYSTEM INCLUDING A BATTERY PACK THAT OUTPUTS A STOP REQUEST SIGNAL AND A CHARGING APPARATUS THAT STOPS POWER CONVERSION IN RECEIPT OF THE STOP REQUEST SIGNAL

CROSS-REFERENCE TO RELATED APPLICATIONS

This application is a Continuation of application Ser. No. 12/385,550, which claims the benefit of Japanese Patent Application No. 2008-105775 filed Apr. 15, 2008 in the Japan Patent Office, the disclosures of which are incorporated herein by reference.

BACKGROUND

The present invention relates to a charging control of a rechargeable battery.

In recent years, a charger provided with a microcomputer for the purpose of achieving high functionality and efficiency is widely used as a charger for charging various rechargeable batteries such as a nickel hydride rechargeable battery and a lithium ion rechargeable battery. In the charger, the microcomputer controls battery charging based on various information inside the charger and also from a battery pack including a rechargeable battery.

Not only the charger but also the battery pack including a rechargeable battery is now being widely used which is provided with a microcomputer and the microcomputer monitors the state (for example, voltage, temperature and so on) of the rechargeable battery and performs various controls based on various information (for example, voltage, temperature and so on) of the rechargeable battery. As noted above, an enhancement of functionality is facilitated by providing a microcomputer in a charging system which charges a rechargeable battery by connecting a battery pack including the rechargeable battery to a charger.

In a case where a microcomputer controls generation of a charging direct-current power inside the charger or charging to a rechargeable battery inside the battery pack, a software error caused in the microcomputer (software anomaly) or hardware anomaly in the microcomputer inhibits normal control by the microcomputer. The rechargeable battery may not be properly charged.

For example, there is a known charger provided with a microcomputer in which, when the microcomputer outputs a charging permission signal, a converter operates to convert an external input power to a charging direct-current power, while, when a charging stop signal is outputted from the microcomputer, the converter is inhibited from operating. If the charging permission signal continues to be outputted from the microcomputer due to anomaly in the microcomputer of the charger constituted as such, the rechargeable battery continues to be charged regardless of its charged state. The rechargeable battery may not be charged appropriately.

To solve the above problem, one technique is disclosed, for example, in Unexamined Japanese Patent Publication No. 2003-299260 in which the power outputted from the converter is periodically turned off (for 10 ms per second, for example) so as to superimpose a periodic pulse from the microcomputer on the output voltage from the converter, and a watchdog circuit detects the pulse superimposed on the output voltage from the converter. If the pulse is not detected normally, the converter is stopped.

SUMMARY

In the above disclosed technique, whether or not the microcomputer controls the converter normally is monitored based on the periodic pulse superimposed on the output voltage from the converter. Thus, the control state of the microcomputer can be monitored only when the output voltage is outputted from the converter to the rechargeable battery (that is, only during charging to the rechargeable battery).

Accordingly, even if some anomaly occurs to the microcomputer inside the charger, for example, in a state where the rechargeable battery is still connected after being charged, the anomaly cannot be detected. Also, for example, there may be a case where a charger is independently operated in a state where the rechargeable battery is not connected but the charger is connected to an external power source (for example, AC 100V power source). If anomaly occurs to the microcomputer in such state, the anomaly cannot be detected.

Regarding not only the microcomputer inside the charger but also the battery pack provided with a microcomputer, the state monitoring, charging control and other various controls of a rechargeable battery inside the battery pack may not be performed normally, if some kind of anomaly occurs to the microcomputer inside the battery pack, even though the microcomputer inside the charger functions normally. In the above described technique, the control state of the microcomputer inside the charger can be only monitored while the battery is being charged. In addition, there is no way to monitor the control state of the microcomputer inside the battery pack.

In one aspect of the present invention, it would be desirable that whether or not an operation state of a control unit involved in charging control of a rechargeable battery is a predesignated operation state can be determined regardless of whether or not the rechargeable battery is being charged.

A charging control device in a first aspect of the present invention includes a control unit and a monitoring unit. The control unit performs at least one of controlling charging to a rechargeable battery and monitoring a state of a rechargeable battery, while outputting a state signal which indicates an operation state of the control unit. The monitoring unit determines whether the operation state of the control unit is a predesignated specified operation state based on the state signal outputted from the control unit.

In the charging control device, the control unit not only performs at least one of controlling charging to a rechargeable battery and monitoring a state of a rechargeable battery, but also outputs a state signal which indicates an operation state of the control unit. Accordingly, the monitoring unit can determine whether or not the operation state of the control unit is the specified operation state regardless of whether or not the rechargeable battery is being charged.

In other words, according to the first aspect of the present invention, it can be determined whether or not the operation state of the control unit involved in charging control of the rechargeable battery is the specified operation state regardless of whether or not the rechargeable battery is being charged.

The control unit may output a signal of any form as the state signal. For example, the control unit may output pulse signals having a preset period as the state signal during operation of the control unit. The monitoring unit may determine whether or not the operation state of the control unit is the specified operation state based on the pulse signals.

In this case, even if the configuration of the monitoring unit is simple, the monitoring unit can determine whether or not the operation state of the control unit is the specified operation state.

The monitoring unit may determine whether or not the operation state of the control unit is the specified operation state based on any characteristics of the pulse signals. For example, the monitoring unit may determine whether or not the operation state of the control unit is the specified operation state based on the period of the pulse signals.

In case that the control unit is a computer, the charging control device may further includes a reset signal output unit that outputs a reset signal to the computer to initialize the computer, when it is determined by the monitoring unit that an operation state of the computer is the specified operation state.

In this case, even if the operation state of the computer is changed to the specified operation state, initialization of the computer can release the computer from the specified operation state.

The monitoring unit and the reset signal output unit may be configured in any manner. For example, both the monitoring unit and the reset signal output unit may be formed as one and the same watchdog timer circuit.

In such configuration, it is not necessary to separately provide the monitoring unit and the reset signal output unit in the charging control device. The configuration of the charging control device can be simplified.

The specified operation state can be any operation state, for example, an operation state defined in advance as an anomalous operation state. In this case, it is possible to determine whether the operation state of the control unit is an anomalous operation state.

The specified operation state may be an operation state defined in advance as that it is inappropriate for the control unit to perform at least one of controlling charging to the rechargeable battery and monitoring the state of the rechargeable battery. In this case, it is possible to determine whether the operation state of the control unit is an operation state inappropriate for the control unit to perform at least one of controlling charging to the rechargeable battery and monitoring the state of the rechargeable battery.

The charging control device may further includes a stop unit that stops charging to the rechargeable battery when it is determined by the monitoring unit that the operation state of the control unit is the specified operation state.

In the charging control device configured as such, charging to the rechargeable battery is stopped when it is determined that the operation state of the control unit is the specified operation state. Possibility that a trouble may occur to the rechargeable battery can be reduced.

The charging control device may be provided in a charging apparatus that includes a power converting unit that converts an externally supplied external power to a charging power for charging the rechargeable battery and outputs the converted charging power. In this case, the control unit may control operation of the power converting unit to control charging to the rechargeable battery, and the stop unit may stop output of the charging power to the rechargeable battery when it is determined by the monitoring unit that the operation state of the control unit is the specified operation state.

In such charging control device, regardless of whether or not the power converting unit is outputting charging power (whether or not the rechargeable battery is being charged), determination can be made all the time on whether or not the operation state of control unit is the specified operation state. Moreover, when it is determined by the monitoring unit that the operation state of the control unit is the specified operation state, the stop unit stops the output of the charging power so as to reduce possibility that a trouble may occur to the rechargeable battery.

The control unit may output to the stop unit an output control signal which selectively indicates one of permission and stop of the output of the charging power. In this case, the stop unit may selectively permits and stops the output of the charging power to the rechargeable battery based on the output control signal inputted from the control unit, while stopping the output of the charging power to the rechargeable battery regardless of indication of the output control signal when it is determined by the monitoring unit that the operation state of the control unit is the specified operation state.

In the charging control device configured as such, the output of the charging power can be permitted or stopped by the control unit. When it is determined that the operation state of the control unit is the specified operation state, the output of the charging power can be stopped even though the control unit permits the output of the charging power.

The stop unit may stop the output of the charging power to the rechargeable battery when a stop request signal is externally received which requests a stop of charging to the rechargeable battery. In this case, in response to the external request, charging to the rechargeable battery can be stopped.

The external power may be a direct-current power or an alternating-current power.

When the external power is an alternating-current power having a predetermined alternating-current voltage, the power converting unit may include: a transformer that converts the alternating-current voltage of the external power; and an output smoothing circuit that generates the charging power by smoothing the alternating-current power after transformed by the transformer.

In the case of the power converting unit configured as such, the stop unit may interrupt a current-carrying path from a power source of the external power to a rechargeable battery side through the transformer and the output smoothing circuit, when it is determined by the monitoring unit that the operation state of the control unit is the specified operation state.

According to the charging control device configured as above, transformation of an alternating-current voltage of the external power can be avoided, for example, by interrupting the current-carrying path from the power source of the external power to the transformer to interrupt input of the external power to the transformer. Also, for example, output of the charging power can be interrupted by interrupting the current-carrying path from the transformer to the output smoothing circuit or from the output smoothing circuit to the rechargeable battery.

The power converting unit may include a transformer that includes a primary winding and a secondary winding. In the transformer, a direct-current power obtained from the external power may be inputted to the primary winding. Also, the power converting unit may include a switching element that is provided on a current-carrying path from an output source of the direct power to the primary winding for permitting/interrupting the current-carrying path. Also, the power converting unit may include a switching control unit that generates an alternating-current power in the secondary winding of the transformer by turning on/off the switching element. Moreover, the power converting unit may include an output smoothing circuit that smoothes the alternating-current power generated in the secondary winding of the transformer to generate the charging power. In the power converting unit configured as above, the stop unit may forcibly turn off the switching element when it is determined by the monitoring unit that the operation state of the control unit is the specified operation state.

In the charging control device as such, when the operation state of the control unit is the specified operation state, transformation by the transformer is not performed and an alternating-current power is not generated on the secondary winding side of the transformer. Thus, generation of the charging power can be stopped. In other words, according to the charging control device, the output of the charging power to the rechargeable battery side from the charging apparatus can be reliably stopped.

The stop unit may output to a battery pack containing the rechargeable battery a stop request signal which requests to stop output to the rechargeable battery of the charging power, when it is determined by the monitoring unit that the operation state of the control unit is the specified operation state.

In this case, if the battery pack is configured to be able to stop the output of the charging power to the rechargeable battery in response to the stop request signal, the output of the charging power to the rechargeable battery can be stopped on the battery pack side.

The charging control device may be provided in a battery pack containing a rechargeable battery. In this case, the stop unit may stop output to the rechargeable battery of a charging power for charging the rechargeable battery, when it is determined by the monitoring unit that the operation state of the control unit is the specified operation state.

In the charging control device as such, whether or not the operation state of the control unit is the specified operation state can be determined all the time regardless of whether or not the rechargeable battery is being charged. Moreover, when it is determined by the monitoring unit that the operation state of the control unit is the specified operation state, the stop unit can stop the output of the charging power thereby to reduce possibility that a trouble may occur to the rechargeable battery.

In this case, the stop unit may interrupt a current-carrying path through which the charging power is outputted to the rechargeable battery, when it is determined by the monitoring unit that the operation state of the control unit is the specified operation state.

According to such charging control device, when the operation state of the control unit is the specified operation state, the output of the charging power to the rechargeable battery can be reliably interrupted.

When the charging control device is provided in a battery pack containing a rechargeable battery, the stop unit may output to a charging apparatus that charges the rechargeable battery a stop request signal for stopping the output of the charging power for charging the rechargeable battery, when it is determined by the monitoring unit that the operation state of the control unit is the specified operation state.

In this case, if the charging apparatus is configured to be able to stop the output of the charging power in response to the stop request signal, the output of the charging power to the rechargeable battery can be stopped on the charging apparatus side.

Also, in this case, the stop unit may interrupt the charging power outputted from the charging apparatus to the battery pack, when it is determined by the monitoring unit that the operation state of the control unit is the specified operation state.

According to the charging control device configured as such, when it is determined that the operation state of the control unit is the specified operation state, a stop request signal is outputted to the charging apparatus not only to stop the output of the charging power by the charging apparatus, but also to interrupt the charging power in the battery pack. Thus, possibility that a trouble may occur to the rechargeable battery can be all the more reduced.

The control unit and the monitoring unit may be provided in a battery pack containing a rechargeable battery. The charging control device may further includes a signal output unit that is provided in the battery pack and outputs to a charging apparatus that charges the rechargeable battery a stop request signal that requests a stop of charging to the rechargeable battery when it is determined by the monitoring unit that the operation state of the control unit is the specified operation state. Also, the charging control device may further includes a stop unit that is provided in the charging apparatus and stops charging operation to the rechargeable battery by the charging apparatus in receipt of the stop request signal.

In the charging control device configured as such, when the operation state of the control unit inside the battery pack is the specified operation state, the charging operation to the rechargeable battery by the charging apparatus can be stopped by outputting the stop request signal to the charging apparatus from the battery pack. Thereby, possibility that a trouble may occur to the rechargeable battery can be reduced.

Alternatively, the control unit and the monitoring unit may be provided in a charging apparatus that outputs to a rechargeable battery a charging power for charging the rechargeable battery to charge the rechargeable battery. The charging control device may further includes a signal output unit that is provided in the charging apparatus and outputs to a battery pack containing the rechargeable battery a stop request signal that requests a stop of charging to the rechargeable battery, when it is determined by the monitoring unit that the operation state of the control unit is the specified operation state. The charging control device may further includes an interruption unit that is provided in the battery pack and interrupts the charging power outputted from the charging apparatus in receipt of the stop request signal.

In the charging control device configured as such, when the operation state of the control unit inside the charging apparatus is the specified operation state, the charging power outputted from the charging apparatus can be interrupted in the battery pack side by outputting the stop request signal to the battery pack from the charging apparatus. Thereby possibility that a trouble may occur to the rechargeable battery can be reduced.

A second aspect of the present invention is a charging apparatus that charges a rechargeable battery and includes the charging control device of the first aspect.

According to such charging apparatus, whether or not the operation state of the control unit involved in charging control of the rechargeable battery is the specified operation state can be determined regardless of whether or not the rechargeable battery is being charged.

A third aspect of the present invention is a battery pack that contains a rechargeable battery and includes the charging control device of the first aspect.

According to such battery pack, whether or not the operation state of the control unit involved in charging control of the rechargeable battery is the specified operation state can be determined regardless of whether or not the rechargeable battery is being charged.

A fourth aspect of the present invention is a charging system that includes a battery pack containing a rechargeable battery and a charging apparatus that charges the rechargeable battery, at least one of the charging apparatus and the battery pack including the charging control device of the first aspect.

In the charging system, whether or not the operation state of the control unit involved in charging control of the rechargeable battery is the specified operation state can be determined in at least one of the charging apparatus and the battery pack regardless of whether or not the rechargeable battery is being charged.

BRIEF DESCRIPTION OF THE DRAWINGS

The present invention will now be described by way of example with reference to the accompanying drawings, in which:

FIG. 4 is a flowchart showing a charging control process executed by the control unit according to the first embodiment;

DETAILED DESCRIPTION OF THE PREFERRED EMBODIMENTS

First Embodiment

Figure 1:
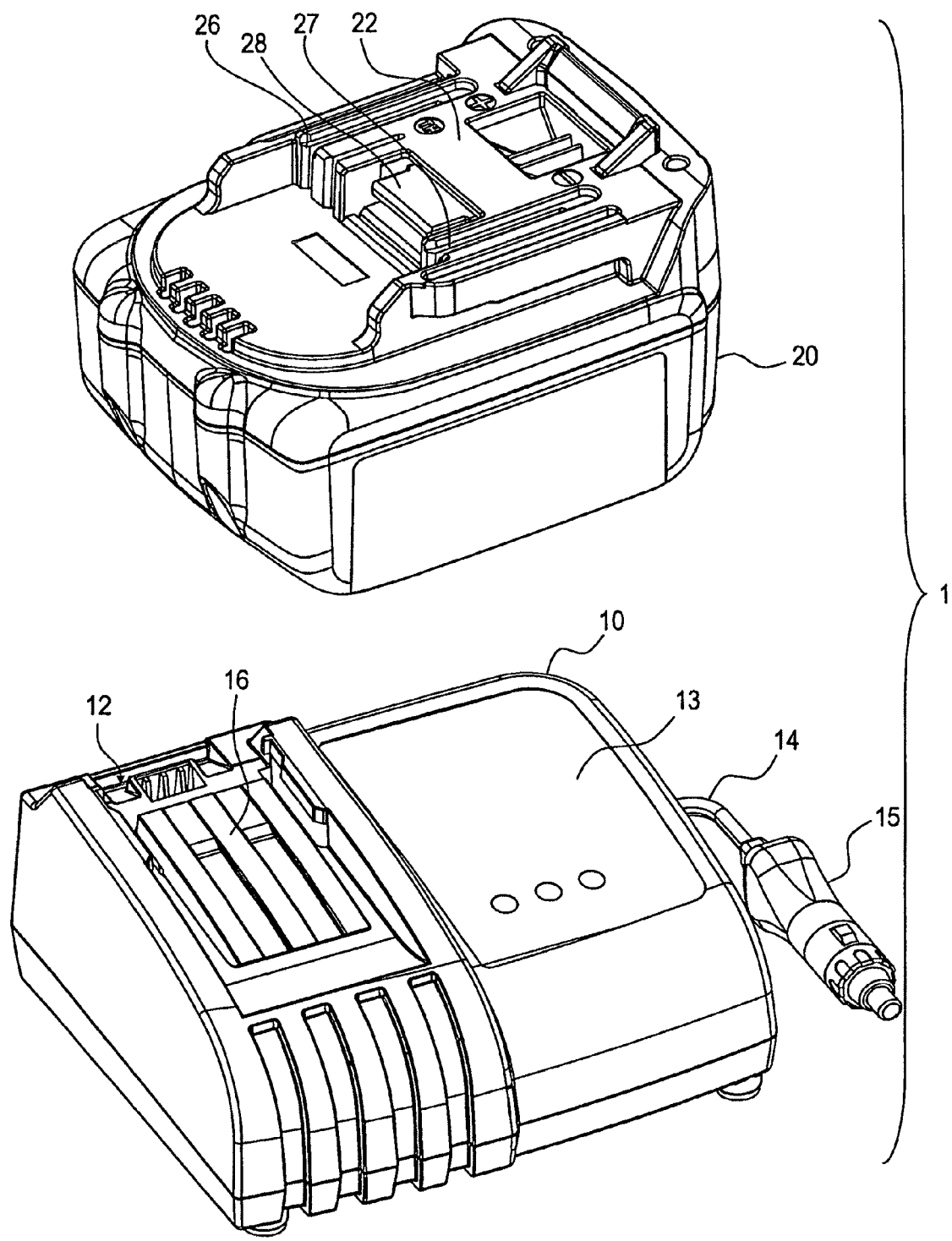
FIG. 1 is a perspective view of a charger and a battery pack which constitute a charging system of a first embodiment according to the present invention.
Figure 2:
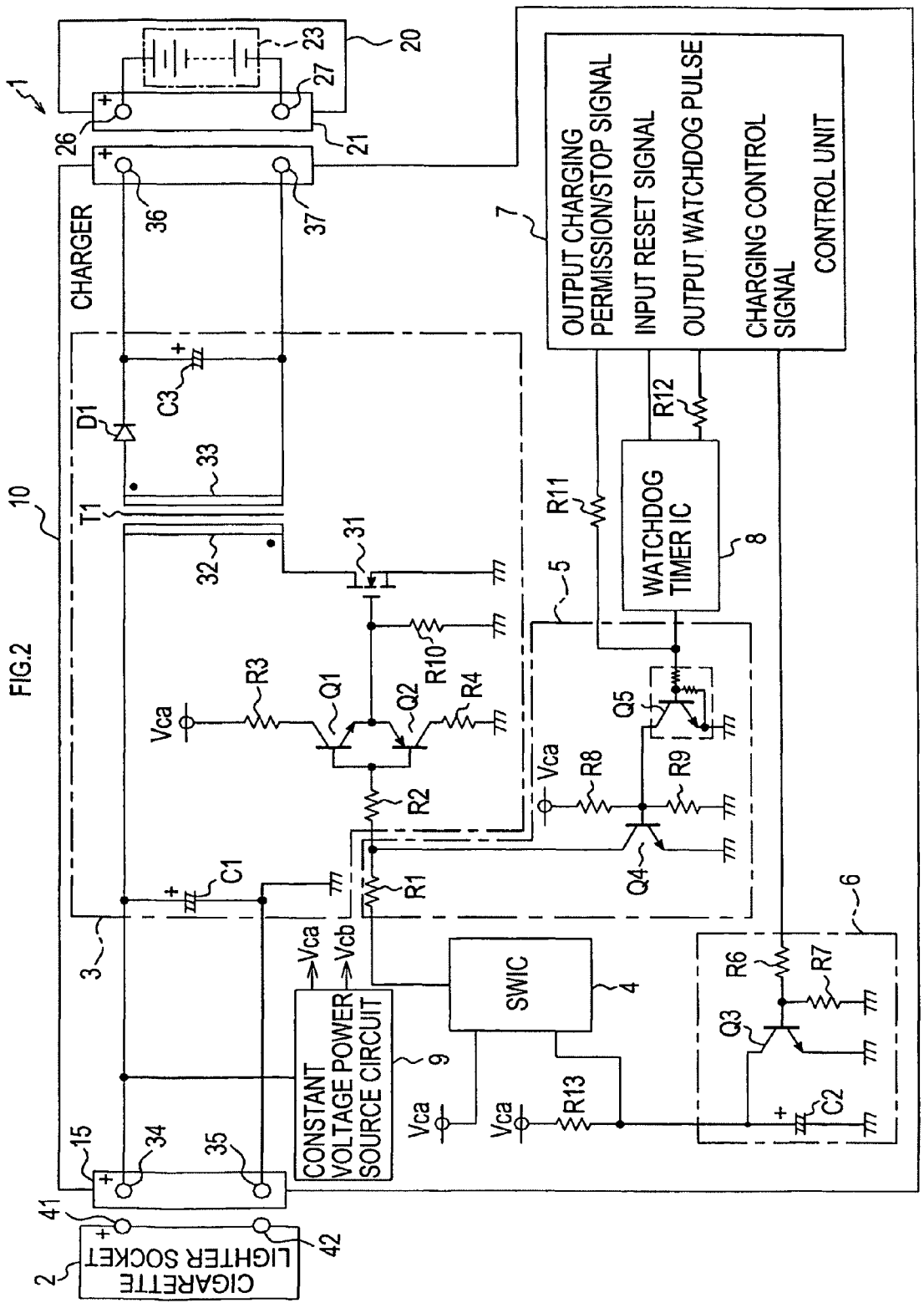
FIG. 2 is an electric diagram showing the charging system of the first embodiment.

A charging system 1 of the present embodiment shown in FIGS. 1 and 2 includes a charger 10 and a battery pack 20 for charging a battery (rechargeable battery) used as a power source, for example, of an electric power tool. The system is configured to charge a rechargeable battery inside the battery pack 20 by the charger 10.

The charger 10 generates a charging power which is a direct-current power for charging the rechargeable battery inside the battery pack 20 from a direct-current power from a cigarette lighter socket 2 (see FIG. 2) provided in a not shown vehicle. A voltage of the direct-current power generated by the charger 10 of the present embodiment may not be strictly constant and include a pulsating flow component. More particularly, the charger 10 includes a cigarette lighter plug 15 to be connected to the cigarette lighter socket 2 for inputting a direct-current power from the battery of the vehicle into the charger 10. When the cigarette lighter plug 15 is inserted into the cigarette lighter socket 2 of the vehicle, a positive terminal 41 and a negative terminal 42 (see FIG. 2) provided in the cigarette lighter socket 2 are respectively connected to a positive terminal 34 and a negative terminal 35 (see FIG. 2) provided in the cigarette lighter plug 15. As a result, a direct-current power is inputted into the charger 10 via a power source cord 14.

On one end side of the top surface of the charger 10, a charging side attachment portion 12 is formed to which the battery pack 20 is attached. A positive side charging terminal 36 (see FIG. 2) and a negative side charging terminal 37 (see FIG. 2) are provided at a predetermined position of the charging side attachment portion 12.

More particularly, the positive side charging terminal 36 and the negative side charging terminal 37 are terminal for outputting a direct-current power to the battery pack 20. The positive side charging terminal 36 and the negative side charging terminal 37 are covered by a protection cover 16 on the top surface of the charging side attachment portion 12. The protection cover 16 is movably provided in the charger 10 in such a manner as to cover the positive side charging terminal 36 and the negative side charging terminal 37 when the battery pack 20 is not attached to the charging side attachment portion 12, while to expose the positive side charging terminal 36 and the negative side charging terminal 37 to the battery pack 20 when the battery pack 20 is attached to the charging side attachment portion 12.

Moreover, the protection cover 16 covers at least one charging side signal terminal (not shown) for transmitting and receiving various signals between the charger 10 and the battery pack 20.

The charger 10 also includes a display portion 13 provided with a plurality of LEDs or the like for displaying an operation state of the charger 10, a charged state of the battery pack 20 and so on, to the outside.

On one side face of the battery pack 20, a battery side attachment portion 22 is formed to which the charging side attachment portion 12 of the charger 10 is attached. At a predetermined position of the battery side attachment portion 22, a positive side charging terminal 26 and a negative side charging terminal 27 are provided. The positive side charging terminal 26 and the negative side charging terminal 27 are terminals into which the charging power supplied from the charger 10 is inputted.

A signal terminal connector 28 is also provided in the battery side attachment portion 22. Inside the signal terminal connector 28, at least one battery side signal terminals (not shown) to be connected to the aforementioned at least one charging side signal terminal in the charger 10 is provided.

When the battery side attachment portion 22 of the battery pack 20 is attached (fitted) to the charging side attachment portion 12 of the charger 10, the positive side charging terminal 36 and the negative side charging terminal 37 in the charger 10 are respectively connected to the positive side charging terminal 26 and the negative side charging terminal 27 in the battery pack 20, as shown in FIG. 2. A charging power generated in the charger 10 is supplied to the rechargeable battery 23 inside the battery pack 20 to charge the rechargeable battery 23.

The rechargeable battery 23 inside the battery pack 20 is an assembled battery in which a plurality of battery cells are connected in series. Each of the battery cells of the present embodiment is a lithium ion rechargeable battery. Use of the lithium ion rechargeable batteries as the rechargeable battery 23 is merely an example. Other types of rechargeable batteries may be used.

In addition to the rechargeable battery 23, the battery pack 20 includes a control unit that monitors the state of the rechargeable battery 23, a thermistor that detects a temperature of the rechargeable battery 23, a non-volatile memory (electrically rewritable) that stores various information such as the charged state/charging history of the rechargeable battery 23, and others. The battery pack 20 is configured such that various operations including charging to the rechargeable battery 23 are controlled by the control unit. Moreover, various information such as the voltage, temperature and so on, of the rechargeable battery 23 in the battery pack 20 are transmitted to the charger 10 side via the above described at least one charging side signal terminal and at least one battery side signal terminal.

Upon supplying electric power of the battery pack 20 to a power recipient such as an electric power tool or the like, the battery side attachment portion 22 is attached to a predetermined attachment portion of the electric power tool or the like as the recipient. As a result, electric power of the battery pack 20 (more particularly, electric power of the internal rechargeable battery 23) is supplied to the electric power tool or the like via the positive side charging terminal 26 and the negative side charging terminal 27.

The battery pack 20 of the present embodiment is configured such that the positive side charging terminal 26, into which the charging power is inputted from the charger 10, is also used as a positive side power output terminal when electric power is supplied to the power recipient such as an electric power tool or the like. This configuration is, however, only an example. A positive terminal when electric power is supplied to an electric power tool or the like may be additionally provided separately from the positive side charging terminal 26 for charging.

As shown in FIG. 2, the charger 10 includes: a converter 3 that converts a direct-current power inputted from the cigarette lighter socket 2 into the above-described charging power of a predetermined voltage to be outputted for charging the rechargeable battery 23 inside the battery pack 20; a control unit 7 that controls overall operation of the charger 10 including the converter 3; a switching IC (SWIC) 4 that controls on/off of a switching FET 31 (later explained) composing the converter 3; a charging permitting/stopping circuit 5 that permits or stops on/off control of the switching FET 31 (and generation of the charging power) by the switching IC 4 according to a control signal (permission signal or stop signal) from the control unit 7; a switching IC control circuit 6 that controls operation of the switching IC 4 according to a charging control signal from the control unit 7; a watchdog timer IC 8 that monitors the operation state of the control unit 7 based on watchdog pulses outputted from the control unit 7; and a constant voltage power source circuit 9 that generates a control voltage for operating various circuits inside the charger 10.

The constant voltage power source circuit 9, when the direct-current power is inputted via the cigarette lighter plug 15, generates the control voltage of a predetermined direct-current constant voltage from the inputted direct-current power. The constant voltage power source circuit 9 of the present embodiment is configured to generate two types of voltages: Vca (12 VDC, for example) and Vcb (5 VDC, for example), as the control voltage. The voltages Vca and Vcb are respectively used for operating various circuits and others inside the charger 10.

The converter 3 includes: an input smoothing capacitor C1 for restricting voltage fluctuation in the direct-current power to be inputted; a transformer T1 for converting (transforming) a direct-current power into a predetermined alternating-current (AC) power; and a diode D1 and an output smoothing capacitor C3 for smoothing the alternating-current power after converted by the transformer T1 to a direct-current power.

A direct-current power (positive) is inputted to one end of a primary winding of the transformer 1. The other end of the primary winding is connected to a drain of the switching FET 31.

The switching FET 31 is a FET as a so-called power semiconductor element, in which a gate of the switching FET 31 is connected to a gate driving circuit composed of two transistors Q1 and Q2, and others, a source of the switching FET 31 is connected to a ground line (grounded), which is a reference potential, and the drain of the switching FET 31 is connected to the other end of the primary winding of the transformer T1 as already described.

The gate driving circuit for driving the gate of the switching FET 31 (and turning on/off the switching FET 31) includes: an input resistor R2; the NPN bipolar transistor Q1; the PNP bipolar transistor Q2; and a resistor R10 for gate bias. In the transistor Q1, a base of the transistor Q1 is connected to the input resistor R2, the control voltage Vca is applied to a collector of the transistor Q1 via a resistor R3, and an emitter of the transistor Q1 is connected to the gate of the switching FET 31. In the transistor Q2, a base of the transistor Q2 is connected to the input resistor R2, a collector of the transistor Q2 is connected to a ground line (grounded) via a resistor R4, and an emitter of the transistor Q2 is connected to the gate of the switching FET 31. The bases of the respective transistors are connected to each other and so are the emitters. In other words, the gate driving circuit of the present embodiment is configured as a push-pull emitter follower circuit that drives the gate of the switching FET 31 by the two transistors Q1 and Q2.

The switching FET 31 is turned on/off by the switching IC 4 which inputs an on/off signal (a high level signal or a low level signal) to the input side (the input resistor R2) of the above configured gate driving circuit. In other words, when a high level signal is outputted from the switching IC 4, the transistor Q1 in the gate driving circuit is turned on. Thereby, the switching FET 31 is turned on. When a low level signal is outputted from the switching IC 4, the transistor Q2 in the gate driving circuit is turned on. Thereby, the switching FET 31 is turned off.

In this manner, the switching FET 31 is driven on/off by the gate driving circuit according to the on/off signal from the switching IC 4. When the switching FET 31 is turned on/off as such, an intermittent electric current (a type of alternating-current) flows into the primary winding of the transformer T1. Thereby, an alternating-current power is generated on the secondary winding side. The alternating-current power is smoothed by the output smoothing circuit composed from the diode D1 and the output smoothing capacitor C3 to generate the charging power. The generated charging power is then outputted to the battery pack 20.

The switching IC 4 operates once the control voltage Vca is applied. The operation is controlled according to the charging control signal from the control unit 7. In other words, the switching IC 4, independently from an input port for the control voltage Vca for operation of the switching IC 4, has a control port into which control information by the control unit 7 is inputted. Into the control port, the control voltage Vca is inputted via a resistor R13. The control port is connected to one end (positive side) of a capacitor C2 of the switching IC control circuit 6 and a collector of a NPN bipolar transistor Q3.

The other end of the capacitor C2 and an emitter of the transistor Q3 of the switching IC control circuit 6 are connected to a ground line (grounded). An input resistor R6 and a base bias resistor R7 are connected to a base of the transistor Q3. The other end of the input resistor R6 is connected to a charging control signal output port of the control unit 7.

The control unit 7 controls various operations inside the charger 10 as a whole. The control unit 7 of the present embodiment is a known microcomputer. The control unit 7 operates once the control voltage Vcb is applied. The control unit 7 outputs the charging control signal to the switching IC control circuit 6, the permission signal or the stop signal to the charging permitting/stopping circuit 5, and the watchdog pulses to the watchdog timer IC 8. Also, when a predetermined condition is satisfied in the watchdog timer IC 8, a reset signal is inputted from the watchdog timer IC 8 to the control unit 7. The control unit 7 is initialized and restarted when the reset signal is inputted.

Not only inputs and outputs of the aforementioned signals, but also, for example, various information inside the charger 10 such as the voltage and current of the charging power, various information inputted from the battery pack 20 and so on, are inputted to the control unit 7. Various controls are performed according to these input information.

The charging control signal inputted from the control unit 7 to the switching IC control circuit 6 is a signal that controls generation of the charging power by the charger 10 and thus, charging to the battery pack 20. After the control unit 7 is started to operate, high level signals as charging control signals are outputted while battery charging is not performed, that is, while a predetermined condition for battery charging is not satisfied. In this case, in the switching IC control circuit 6, the potential of the collector of the transistor Q3 becomes a ground potential since the transistor Q3 is turned on, and the potential of the control port connected to the collector of the transistor Q3 in the switching IC 4 also becomes the ground potential. In this case, the switching IC 4 does not perform on/off control of the switching FET 31.

On the other hand, after the control unit 7 is started to operate and when the predetermined condition for charging to the battery pack 20 is satisfied, the control unit 7 outputs low level signals as the charging control signals. In this case, in the switching IC control circuit 6, the capacitor C2 is gradually charged by the control voltage Vca since the transistor Q3 is turned off, and the potential of the control port of the switching IC 4 becomes the same as the control voltage Vca.

Thereby, the switching IC 4 starts charging (generation/output of the charging power) of the battery pack 20, assuming that a command to start battery charging is issued by the control unit 7. In other words, by outputting an on/off control signal to the gate driving circuit, the switching FET 31 is turned on/off so as to generate the charging power.

In the present embodiment, the charging permitting/stopping circuit 5 is inserted to an output path of the on/off control signal from the switching IC 4 to the gate driving circuit. The charging permitting/stopping circuit 5 operates according to the charging permission/stop signal from the control unit 7. When the permission signal is outputted as the charging permission/stop signal, the charging permitting/stopping circuit 5 activates the on/off control signal from the switching IC 4 to the gate driving circuit. When the stop signal is outputted as the charging permission/stop signal, the charging permitting/stopping circuit 5 inactivates the on/off control signal from the switching IC 4 to the gate driving circuit.

The charging permitting/stopping circuit 5 mainly includes two transistors: a transistor Q5 in which the charging permission/stop signal from the control unit 7 is inputted to a base of the transistor Q5 via a resistor R11; and a transistor Q4 in which a collector of the transistor Q5 is connected to a base of the transistor Q4. The transistor Q5 on the input side includes a base resistor and a bias resistor. An emitter of the transistor Q5 is connected to a ground line (grounded). The charging permitting/stopping circuit 5 also includes a voltage divider circuit. The voltage divider circuit includes: a voltage divider resistor R8, to one end of which the control voltage Vca is applied and the other end of which is connected to the collector of the transistor Q5 on the input side (that is, to the base of the transistor Q4 on the output side); and a voltage divider resistor R9 connected to the other end of the resistor R8 on one end and to a ground line on the other end.

In the above configured charging permitting/stopping circuit 5, when the permission signal (high level signal) as the charging permission/stop signal is inputted from the control unit 7 via the resistor R11, the transistor Q5 on the input side is turned on. As a result, a collector potential of the transistor Q5, that is a base potential of the transistor Q4 on the output side becomes low level and thus, the transistor Q4 on the output side is turned off. Thereby, an impedance of the collector side of the transistor Q4 on the output side becomes high-impedance to a connection point of the resistors R1 and R2. Accordingly, the on/off control signal from the switching IC 4 is transmitted to the gate driving circuit via the resistors R1 and R2. The switching FET 31 is turned on/off according to the on/off control signal.

When the stop signal (low level signal) as the charging permission/stop signal is inputted from the control unit 7 via the resistor R11, the transistor Q5 on the input side is turned off. As a result, the collector potential of the transistor Q5, that is the base potential of the transistor Q4 on the output side becomes a voltage division value of the control voltage Vca by the respective voltage divider resistors R8 and R9 (voltage of the voltage divider resistor R9) and thus, the transistor Q4 on the output side is turned on. Thereby, the potential of the collector of the transistor Q4 on the output side becomes low level (ground potential), that is, a connection point potential of the resistors R1 and R2 becomes the ground potential. Accordingly, the on/off control signal, even if transmitted from the switching IC 4, is not transmitted to the gate driving circuit. The switching FET 31 remains turned off.

In other words, the charging permitting/stopping circuit 5 permits on/off of the switching FET 31 by the switching IC 4 when the high level permission signal is inputted as the charging permission/stop signal from the control unit 7, while the charging permitting/stopping circuit 5 disables on/off of the switching FET 31 by the switching IC 4 when the low level stop signal is inputted as the charging permission/stop signal.

Accordingly, the control unit 7 basically commands the switching IC 4 to perform battery charging by outputting the low level charging control signal to the switching IC control circuit 6 upon charging. Furthermore, by outputting the high level permission signal to the charging permitting/stopping circuit 5, the control unit 7 permits (activates) the on/off control of the switching FET 31 by the switching IC 4. As a result, the switching FET 31 is turned on/off and the charging power is generated to be outputted to the battery pack 20. When stopping charging, the control unit 7 outputs the low level stop signal to the charging permitting/stopping circuit 5 to stop (inactivate) the on/off control of the switching FET 31 by the switching IC 4. Furthermore, by outputting the high level charging control signal to the switching IC control circuit 6, the control unit 7 disables the operation of the switching IC 4 itself (output of the on/off control signal).

The control unit 7 also outputs watchdog pulses to the watchdog timer IC 8 as previously described. The watchdog pulses are pulse signals nearly periodically outputted in the process of execution of a charging control process program by the control unit 7. In other words, the charging control process program includes a process step to output the watchdog pulses in preset periods. The control unit 7, when turned on and started to operate, executes the charging control process program at all times during its operation.

Figure 3A:
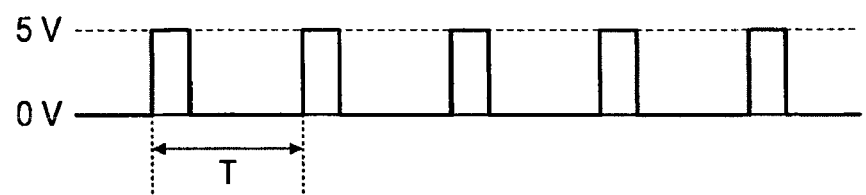
FIG. 3A is an explanatory view illustrating an example of watchdog pulses outputted from a control unit when the control unit is in a normal state.

Accordingly, as long as the control unit 7 operates normally, the watchdog pulses continue to be outputted from the control unit 7 in preset periods. The watchdog pulses shown in FIG. 3A is an example of the watchdog pulses outputted when the control unit 7 is in a normal state. The watchdog pulses shown in FIG. 3A are generated by repeatedly executing, in a period T, a process step of setting an output voltage to high level (5V) for a given length of time and then setting the output voltage to low level for a given length of time.

The watchdog pulses illustrated in FIG. 3A have been explained to be outputted in the constant period T. However, this does not necessarily mean that the watchdog pulses are (must be) outputted exactly in the period T. As described in the above, the watchdog pulses are outputted by execution of the program. Thus, depending of the process speed and process steps or the like of the program execution, it is very likely that the period of outputting the watchdog pulses is not consistent with the period T (it is rather more difficult to strictly conform the period of outputting the watchdog pulses to the period T). Thus, slight deviation from the period T is acceptable. The watchdog pulses within the acceptable range are regarded as being outputted in the period T.

The watchdog timer IC 8 monitors whether or not the control unit 7 operates normally based on the watchdog pulses outputted from the control unit 7. Particularly, whether or not the watchdog pulses are outputted normally from the control unit 7 is determined, for example by measuring elapsed time from when the voltage of the watchdog pulses is turned to high level last time until when the watchdog pulses are again turned to high level, and so on. Based on the determination result, the operation state of the control unit 7 is monitored.

If the control unit 7 is in a normal state, the watchdog pulses are outputted in the preset period T, as shown in FIG. 3A. Thus, the watchdog timer IC 8 determines that the control unit 7 operates normally based on the watchdog pulses. The reset signal to the control unit 7 is not outputted (in other words, the reset signal is made to high level).

On the other hand, in the case of a software error caused in the charging control process executed by the control unit 7 (software anomaly) or hardware anomaly in the control unit 7, generation of the charging power may not be controlled normally. Thus, in the case of anomaly in the control unit 7 as described in the above, the stop signal (low level) has to be transmitted to the charging permitting/stopping circuit 5 as the charging permission/stop signal so that battery charging is stopped.

However, in the case of anomaly in the control unit 7, it is difficult for the control unit 7 in itself to control its performance such as outputting the stop signal to the charging permitting/stopping circuit 5 due to the anomaly to itself. Thus, even though anomaly occurs to the control unit 7 and battery charging should be stopped, the permission signal may continue to be outputted to the charging permitting/stopping circuit 5 from the control unit 7. Battery charging may be continued.

In the charger 10 of the present embodiment, the reset signal from the watchdog timer IC 8 is outputted not only to the control unit 7 but also to the charging permitting/stopping circuit 5. The reset signal from the watchdog timer IC 8 is inputted to the base of the transistor Q5 on the input side of the charging permitting/stopping circuit 5, in the same manner as the charging permission/stop signal inputted from the control unit 7.

By such configuration, when the control unit 7 operates normally and battery charging is performed, the charging permission/stop signal from the control unit 7 is the permission signal (high level). The reset signal (low level signal) is not outputted from the watchdog timer IC 8 to the charging permitting/stopping circuit 5. Battery charging operation is permitted. In the explanation below, the reset signal (low level) from the watchdog timer IC 8 to be inputted to the control unit 7 is referred to as a "first reset signal", while the reset signal to be inputted to the charging permitting/stopping circuit 5 is referred to as a "second reset signal".

Figure 3B:
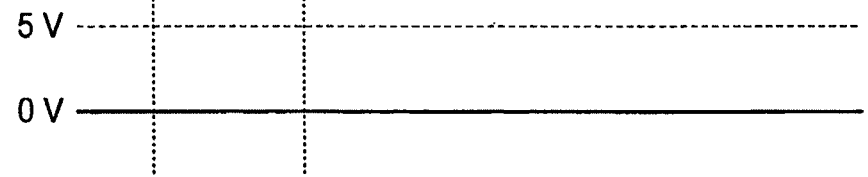
FIG. 3B is an explanatory view illustrating an example of watchdog pulses outputted from the control unit when the control unit is in an anomalous state.
Figure 3C:
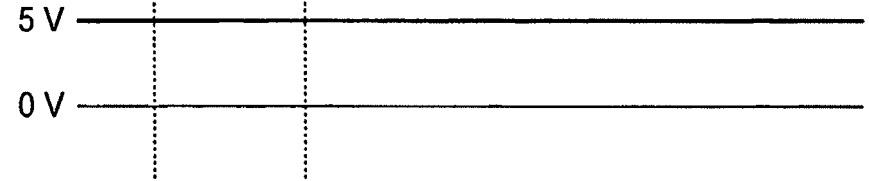
FIG. 3C is an explanatory view illustrating another example of watchdog pulses outputted from the control unit when the control unit is in an anomalous state.
Figure 3D:
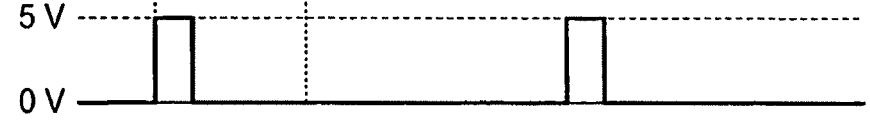
FIG. 3D is an explanatory view illustrating further another example of watchdog pulses outputted from the control unit when the control unit is in an anomalous state.

As anomaly such as a software error occurs to the control unit 7 and the permission signal from the control unit 7 continues to be outputted, battery charging operation by the charging permitting/stopping circuit 5 continues to be permitted. However, if anomaly occurs to the control unit 7 as such, the watchdog pulses are not outputted normally. Examples of the watchdog pulses when the control unit 7 is in an anomalous state are, as shown in FIGS. 3B-3D, a continuous low level state of the watchdog pulses (FIG. 3B), a continuous high level state of the watchdog pulses (FIG. 3C), a state in which the watchdog pulses are outputted only in a period larger than the output period T of a normal time (that is, the signals do not shift to high level even after the period T) (FIG. 3D), and so on.

Therefore, the watchdog timer IC 8, when it is determined that the watchdog pulses are not outputted normally, that is, the control unit 7 is not operating normally, based on the watchdog pulses, outputs the first reset signal to the control unit 7, and further outputs the second reset signal to the charging permitting/stopping circuit 5.

When the second reset signal is inputted from the watchdog timer IC 8 to the charging permitting/stopping circuit 5 as such, the transistor Q5 on the input side is turned off even though the permission signal is still outputted from the control unit 7, because the second reset signal is inputted from the watchdog timer IC 8. As a result, the transistor Q4 on the output side is turned on. The connection point potential of the resistors R1 and R2 becomes a ground potential. The battery charging is forced to be stopped.

When it is determined that the operation of the control unit 7 is anomalous, the watchdog timer IC 8 outputs the first reset signal to the control unit 7 to initialize the control unit 7.

In case that the anomaly of the control unit 7 is, for example, caused by a software error and thus the permission signal is kept outputted, output of the first reset signal to the control unit 7 and the subsequent initialization of the control unit 7 by the watchdog timer IC 8 may restore the control unit 7 to a normal state.

However, the first reset signal may not be normally inputted to the control unit 7 from the watchdog timer IC 8, for example, due to some anomaly in an input path of the first reset signal to the control unit 7 from the watchdog timer IC 8 or, even if the first reset signal is normally inputted, some anomaly may occur inside the control unit 7 and an initialization inside the control unit 7 may not be normally performed. Also, for example, even though the control unit 7 is initialized, a software error may immediately occur once again and normal charging may be unable to be performed. Accordingly, if determination on whether or not to permit battery charging is left independently to the control unit 7, it is not always possible to stop battery charging at the time when anomaly occurs to the control unit 7.

In the present embodiment, when the watchdog timer IC 8 determines that some anomaly has occurred to the control unit 7, the watchdog timer IC 8 directly output the second reset signal to the charting permitting/stopping circuit 5 without involving the control unit 7. In this manner, battery charging is forced to be stopped regardless of the charging permission/stop signal from the control unit 7.

Figure 5:
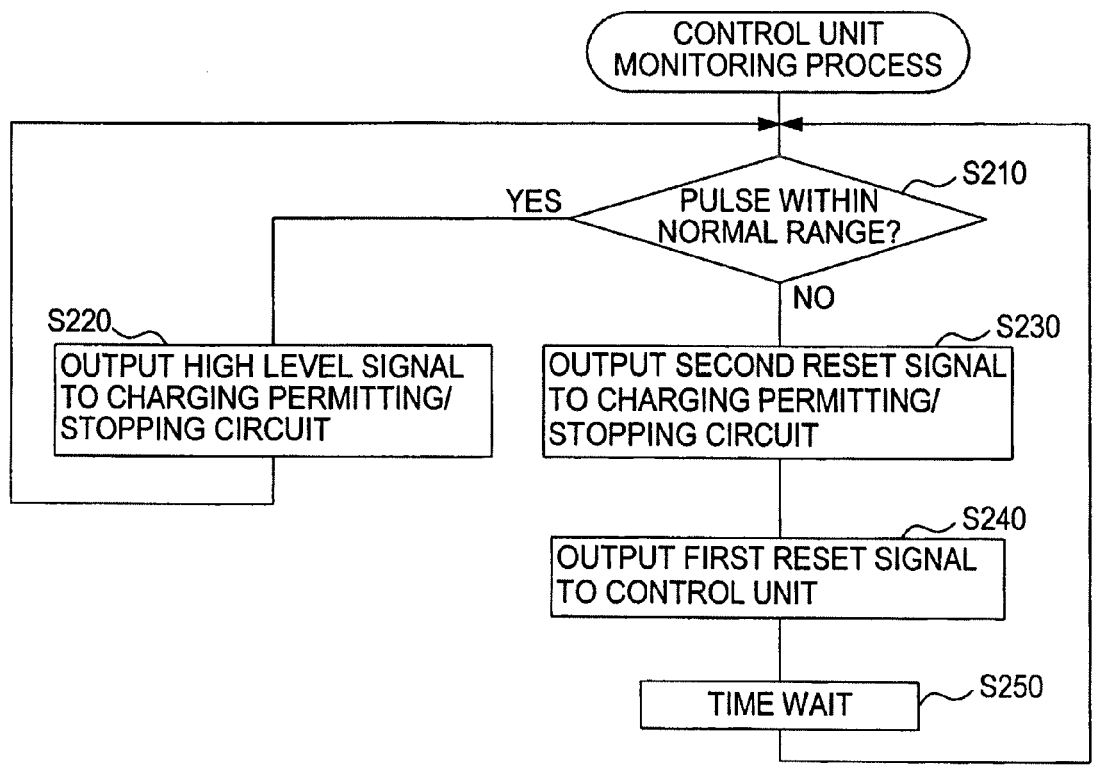
FIG. 5 is a flowchart showing a control unit monitoring process executed by a watchdog timer IC of the first embodiment.

Now, a charging control process executed by the control unit 7 and a control unit monitoring process executed by the watchdog timer IC 8 in the charger 10 of the present embodiment constituted as above will be explained by way of FIGS. 4 and 5.

The control unit 7, when the control voltage Vcb is applied to start operation of the control unit 7, executes the charging control process shown in FIG. 4 on a steady basis during its operation.

When the process is started, first a watchdog timer (WDT) process is executed (S110). Particularly, in the WDT process, a high level signal is first outputted from a port for outputting a watchdog pulse. After elapse of a certain time period (Time Wait), a low level signal is outputted and the elapse of the certain time period is awaited (Time Wait). In other words, the WDT process of S110 is a process of outputting the watchdog pulses for one period shown in FIG. 3A.

After the output of the watchdog pulses for one period, it is determined whether or not the battery pack 20 is attached (S120). The determination is performed, for example, by the control unit 7 which determines whether or not there is a connection with the thermistor circuit inside the battery pack 20 based on an electric level of at least one charging side signal terminal mentioned above.

Here, if the battery pack 20 is not yet attached (S120: NO), the process returns to S110. If the battery pack 20 is attached (S120: YES), battery charging is started (S130). In other words, the control unit 7 outputs the low-level charging control signal to the switching IC control circuit 6 to instruct the switching IC 4 to start charging, and also outputs the permission signal (high-level signal) to the charging permitting/stopping circuit 5. As a result, on/off control of the switching FET 31 by the switching IC 4, and generation/output of the charging power, are started.

The WDT process is again performed in the same manner as in S110 to output the watchdog pulses for one period (S140). Moreover, is it determined whether or not the battery pack 20 is detached (S150). If the battery pack 20 is detached from the charger 10 (S150: YES), a charging stop process is performed (S200). The process returns to S110 again. The charging stop process facilitates output of the high-level charging control signal to the switching IC control circuit 6 and removes the charging instructions to the switching IC 4. Also, a stop signal (low-level signal) is outputted to the charging permitting/stopping circuit 5 from the control unit 7.

When it is determined that the battery pack 20 is not yet detached in the determination step of S150 (S150: NO), it is determined whether or not the rechargeable battery 23 inside the battery pack 20 is fully charged (S160). The determination can be performed, for example, based on a detection value obtained by directly or indirectly detecting the voltage of the rechargeable battery 23. If it is determined in this determination step that the rechargeable battery 23 is not fully charged (S160: NO), the process returns to S140. If it is determined that the rechargeable battery 23 is fully charged (S160: YES), a charging completion process is performed (S170). The charging completion process, which is basically the same as the charging stop process in S200, stops the on/off control of the switching FET 31 by the switching IC 4 to stop the battery charging operation.

After the charging completion process in S170, the WDT process is performed again in the same manner as in S110 to output the watchdog pulses for one period (S180). Moreover, in the same manner as in S150, it is determined whether or not the battery pack 20 is detached (S190). If not (S190: NO), the process returns to S180. If the battery pack 20 is detached (S190: YES), the process returns to S110.

As above, the control unit 7, when starting the operation, executes the charging control process of FIG. 4 on a steady basis during its operation. Thereby, as long as the control unit 7 operates normally (that is, as long as the charging control process is performed normally by the control unit 7), the watchdog pulses are periodically outputted, regardless of whether or not battery charging is being performed and whether or not the battery pack 20 is attached.

Now, a control unit monitoring process executed by the watchdog timer IC 8 will be explained using a flowchart of FIG. 5. The monitoring process to the control unit 7 based on the watchdog pulses by the watchdog timer IC 8 is performed by hardware (logic circuit) in practice. However, in the present embodiment, the hardware process is replaced with a flowchart for the sake of easy understanding.

As the watchdog timer IC 8 starts the control unit monitoring process, it is first determined whether or not the watchdog pulses from the control unit 7 are within a normal range, that is, whether or not the watchdog pulses are outputted in the predetermined cycle T (S210). The determination is performed by setting a permissible range to a certain extent. For example, when the elapsed time since the watchdog pulse has been previously inputted exceeds the period T+α (α is a given value), it is determined that the watchdog pulses are not within the normal range.

When it is determined that the watchdog pulses are within the normal range (S210: YES), the control unit 7 is considered operating normally. The output signal to the charging permitting/stopping circuit 5 is set to high level (S220). The process returns to S210. In other words, while the control unit 7 is in a normal state and the watchdog pulses are outputted normally, the steps from S210-S220 are repeated.

On the other hand, when anomaly such as a software error occurs to the control unit 7 and the watchdog pulses are not outputted normally (S210: NO), the watchdog timer IC 8 outputs the second reset signal to the charging permitting/stopping circuit 5 (S230), and outputs the first reset signal to the control unit 7 (S240). After standing by for a certain time period (S250), the process returns to S210.

As described in the above, the charging system 1 of the present embodiment, the control unit 7 controls generation/output of the charging power in the charger 10. When battery charging is performed, the control unit 7 outputs the low-level charging control signal to the switching IC control circuit 6 to instruct the switching IC 4 to start charging. Also, the control unit 7 outputs the high-level charging permission/stop signal (permission signal) to the charging permitting/stopping circuit 5 so that the battery charging is started. The watchdog timer IC 8 monitors the operation state of the control unit 7 based on the watchdog pulses outputted in a certain period from the control unit 7 while the control unit 7 operates normally. When determining that the operation of the control unit 7 is anomalous, the watchdog timer IC 8 outputs the first reset signal to the control unit 7 and also output the second reset signal to the charging permitting/stopping circuit 5, thereby forcing to stop the battery charging operation regardless of indication of the signal from the control unit 7 to the charging permitting/stopping circuit 5.

According to the charging system 1 of the present embodiment, regardless of whether or not the battery pack 20 is attached to the charger 10 and of whether or not the rechargeable battery 23 is being charged, the watchdog timer IC 8 is able to monitor the operation state of the control unit 7 at all times. When it is determined that the control unit 7 is not operating normally, the watchdog timer IC 8 itself can directly output the second reset signal to the charging permitting/stopping circuit 5 regardless of indication of the charging permission/stop signal from the control unit 7 to the charging permitting/stopping circuit 5, in order to forcibly stop the battery charging operation. Thus, possibility that a trouble may occur to the rechargeable battery 23 due to anomaly of the control unit 7 can be reduced. In other words, anomaly of the control unit 7 can be appropriately treated.

A particular method to forcibly stop battery charging at the time of anomaly of the control unit 7 is to invalidate the on/off signal from the switching IC 4 to the switching FET 31. In other words, not that the charging power is not outputted to the battery pack 20 side, but generation itself of the charging power is stopped. In this manner, output of the charging power to the battery pack 20 side can be reliably stopped.

Moreover, in the present embodiment, when anomaly occurs to the control unit 7, the watchdog timer IC 8 forcibly stops the battery charging operation and resets the control unit 7. Thus, for example, in a case, such as anomaly by a software error, where mere initialization allows restoration of the control unit 7 to a normal state, the control unit 7 can be immediately restarted even if falling in an anomalous state. Therefore, it is more effective.

Second Embodiment

Figure 6:
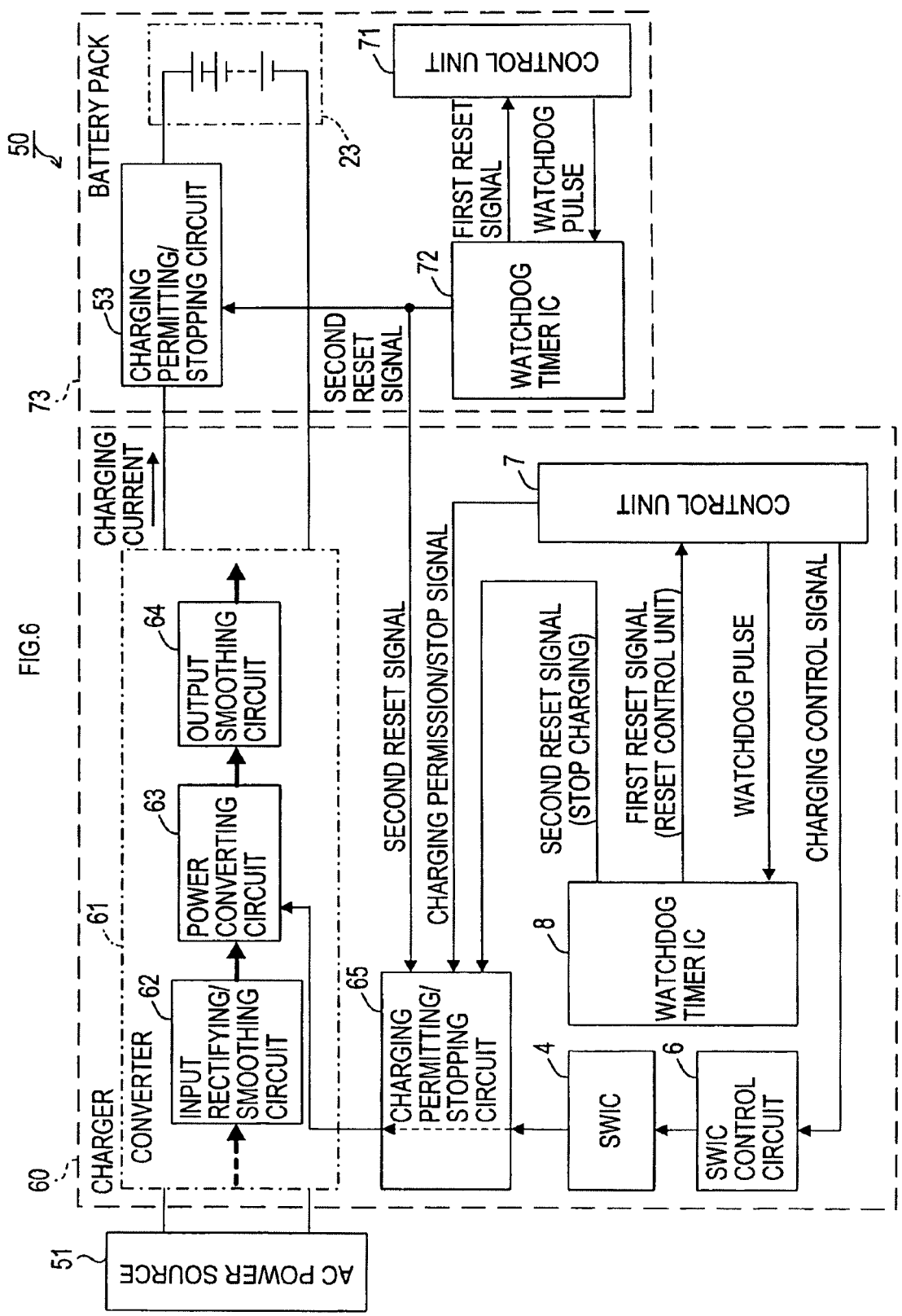
FIG. 6 is a block diagram showing a charging system of a second embodiment.

Now, a charging system according to a second embodiment will be explained by way of FIG. 6. A charging system 50 of the present embodiment is different from the charging system 1 of the first embodiment in that the supply source of the external power inputted to a charger 60 is an alternating-current power source 51 in the present embodiment. Thus, a converter 61 of the charger 60 includes: an input rectifying/smoothing circuit 62 that rectifies an alternating-current power from the alternating-current power source 51 to be converted to a direct-current power; a power converting circuit 63 that converts the direct-current power from the input rectifying/smoothing circuit 62 to an alternating-current power having a predetermined alternating-current voltage; and an output smoothing circuit 64 that smoothes the alternating-current power converted by the power converting circuit 63 to generate a charging power.

The power converting circuit 63 is identical to the portion in FIG. 2 made up from the transformer T1, the switching FET 31 and the gate driving circuit (transistors Q1, Q2 and so on). The output smoothing circuit 64 is identical to the output smoothing circuit made up from the diode D1 and the output smoothing capacitor C3 in FIG. 2.

A battery pack 73 of the present embodiment includes: a control unit 71 that monitors a state of the rechargeable battery 23 which is charged with the charging power inputted from the charger 60; a watchdog timer IC 72 that monitors an operation state of the control unit 71; and a charging permitting/stopping circuit 53 that, when it is determined by the watchdog timer IC 72 that the control unit 71 is not operating normally, interrupts supply of the charging power to the rechargeable battery 23.

The control unit 71 of the battery pack 73, as in the control unit 7 inside the charger 60, outputs watchdog pulses on a steady basis all the time during its operation as long as itself operates normally. The watchdog timer IC 72 inside the battery pack 73 monitors the operation state of the control unit 71 in the same manner as the watchdog timer IC 8 inside the charger 60 based on the watchdog pulses from the control unit 71. When determining that the control unit 71 is not operating normally, the watchdog timer IC 72 outputs the first reset signal to the control unit 71 to initialize the same and also outputs the second reset signal to the charging permitting/stopping circuit 53.

The charging permitting/stopping circuit 53 of the battery pack 73 is provided, inside the battery pack 73, on a current-carrying path (power feeding path) through which the charging power inputted from the charger 60 is inputted to the rechargeable battery 23, and permits or interrupts the current-carrying path. Particularly, while it is determined by the watchdog timer IC 72 that the control unit 71 is operating normally, the current-carrying path is permitted so that charging to the rechargeable battery 23 is enabled. On the other hand, when it is determined by the watchdog timer IC 72 that the control unit 71 is not operating normally, the watchdog timer IC 72 outputs the second reset signal. The second reset signal urges the charging permitting/stopping circuit 53 to interrupt the current-carrying path and to forcibly stop feeding of the charging power to the rechargeable battery 23.

The charging permitting/stopping circuit 53 of the battery pack 73 may be configured in any manner as long as the current-carrying path can be permitted/interrupted depending on presence and absence of the second reset signal from the watchdog timer IC 72.

Moreover, in the charging system 50 of the present embodiment, when the watchdog timer IC 72 of the battery pack 73 determines that the operation state of the control unit 71 is anomalous, the watchdog timer IC 72 not only outputs the second reset signal to the charging permitting/stopping circuit 53 of the battery pack 73, but also outputs the second reset signal to the charging permitting/stopping circuit 65 inside the charger 60. The charging permitting/stopping circuit 65 inside the charger 60 is different from the charging permitting/stopping circuit 5 of the first embodiment only in that the second reset signal is inputted from not only the watchdog timer IC 8 inside the charger 60 but also the watchdog timer IC 72 inside the battery pack 73. The charging permitting/stopping circuit 65 is the same as the charging permitting/stopping circuit 5 of the first embodiment in other parts.

The charging system 50 of the present embodiment is basically the same as the charging system 1 of the first embodiment with respect to other configuration. Accordingly, the same reference number as in the first embodiment is given to the same component as that of the charging system 1 of the first embodiment, and the description thereof is omitted.

In the charging system 50 of the present embodiment configured as above, the charger 60 monitors the operation state of the control unit 7 in the charger 60 by the watchdog timer IC 8, in the same manner as in the charger 10 of the first embodiment. When it is determined that the control unit 7 is not operating normally, generation of the charging power is forcibly stopped by the second reset signal.

In addition, in the present embodiment, even inside the battery pack 73, the watchdog timer IC 72 monitors the operation state of the control unit 71. If the watchdog timer IC 72 determines that the control unit 71 is not operating normally, the current-carrying path (power feeding path) to the rechargeable battery 23 inside the battery pack 73 is interrupted by the second reset signal.

In this manner, the charger 60 and the battery pack 73 respectively monitor the operation state of the built-in control unit individually. When anomaly occurs, a predetermined operation is performed so as not to charge the rechargeable battery 23.

Moreover, in the present embodiment, when the control unit 71 inside the battery pack 73 is in an anomalous state, not only the current-carrying path to the rechargeable battery 23 is interrupted by the charging permitting/stopping circuit 53 inside the battery pack 73, but also generation of the charging power by the charger 60 is stopped.

According to the charging system 50 of the present embodiment, the watchdog timer IC 72 can monitor the operation state of the control unit 71 on a steady basis in the battery pack 73 as well, in the same manner as in the charger 60 (also in the same manner as in the charger 10 of the first embodiment), regardless of whether or not the charging to the rechargeable battery 23 is performed. When it is determined that the control unit 71 is not operating normally, the current-carrying path to the rechargeable battery 23 is interrupted to forcibly and reliably stop the charging.

When anomaly occurs to the control unit 71 inside the battery pack 73, the second reset signal is inputted to the charging permitting/stopping circuit 65 of the charger 60. Thereby, generation of the charging power in the charger 60 itself is forcibly stopped. The charging to the rechargeable battery 23 can be reliably stopped in response to anomaly of the control unit 71.

[Variation]

The embodiments of the present invention have been described in the above. However, the present invention is not limited to the aforementioned embodiments but can take various modes without departing from the technical scope of the present invention.

For instance, in the charger 10 of the charging system 1 of the first embodiment, when it is determined by the watchdog timer IC 8 that the control unit 7 is in an anomalous state, the second reset signal is outputted to the charging permitting/stopping circuit 5 so as to invalidate the on/off control of the switching FET 31 by the switching IC 4. However, the configuration of the watchdog timer IC 8 and the configuration of the charging permitting/stopping circuit 5 are not limited to those described in the first embodiment. The watchdog timer IC 8 and the charging permitting/stopping circuit 5 can be configured, for example, as shown in FIG. 7.

Figure 7:
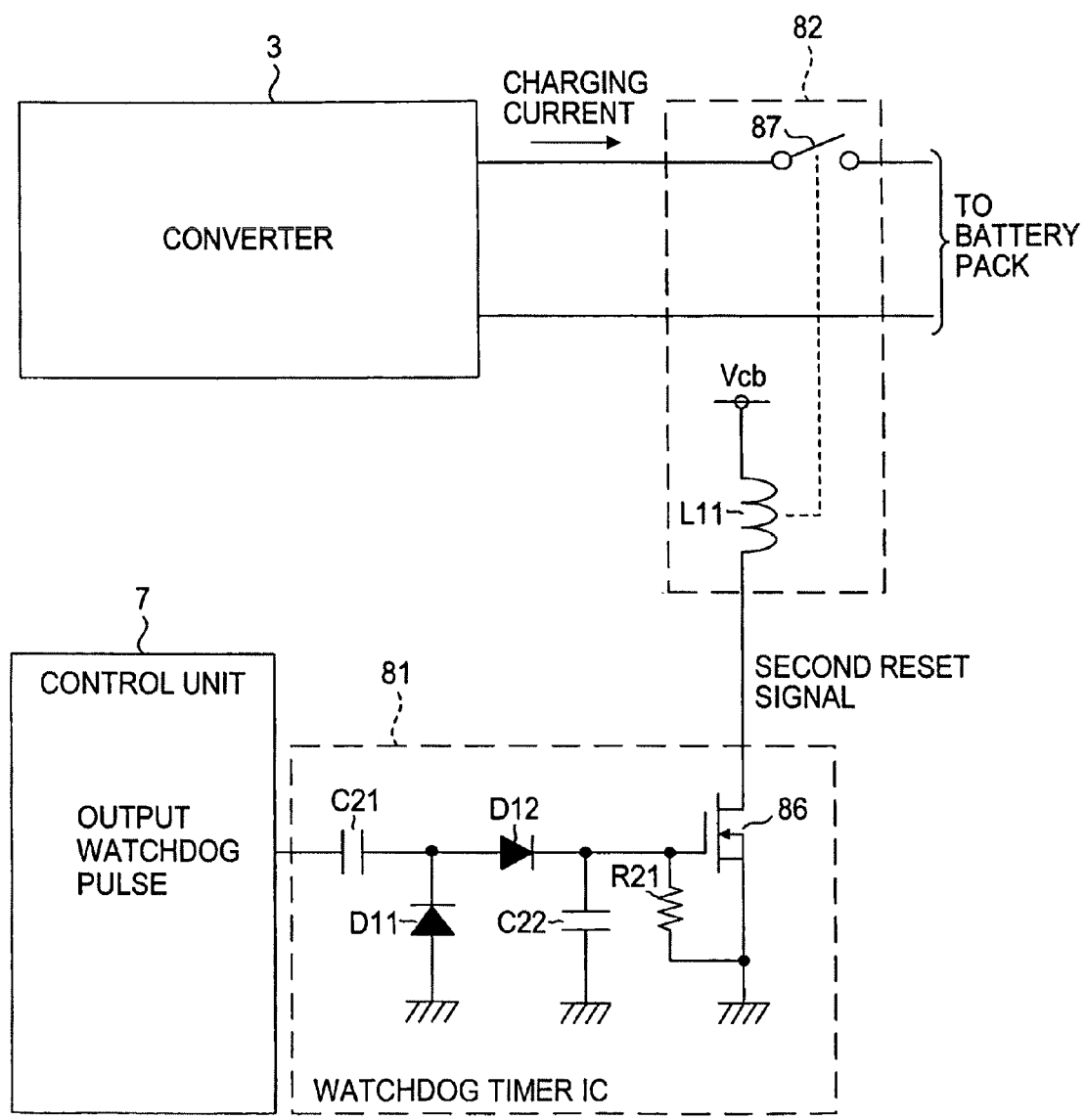
FIG. 7 is an explanatory view showing a variation of a watchdog timer circuit and a charging permitting/stopping circuit.

In FIG. 7, a watchdog timer IC 81 is configured as a discreet circuit, and a charging permitting/stopping circuit 82 is configured to permit/interrupt a current-carrying path (power output path) to the battery pack 20 side from the converter 3.

In other words, in the watchdog timer IC 81 of FIG. 7, when the watchdog pulses (high level) are inputted from the control unit 7, capacitors C21 and C22 are charged. As the watchdog pulses become low level, the electric charges for charging to the capacitor 21 are discharged via a diode D11 and a circuit (ground) inside the control unit 7. The electric charges for charging to the capacitor C22 are inhibited from being discharged by a diode D12 and retained, but are little by little discharged via a resistor R21. However, since the charging pace by the watchdog pulses is much faster than the discharging pace, the charging voltage of the capacitor C21 is gradually increased each time the watchdog pulses are outputted. Consequently, a FET 86 is turned on.

A source of the FET 86 is connected to a ground line. The control voltage Vcb is applied to its drain via a relay coil L11 inside the charging permitting/stopping circuit 82. In the charging permitting/stopping circuit 82, a relay contact (a contact) 87 is arranged on an output path (current-carrying path on a positive side) of the charging power from the converter 3.

Accordingly, while the control unit 7 operates normally and the watchdog pulses are inputted normally from the control unit 7 to the watchdog timer IC 81, the FET 86 is turned on in the watchdog timer IC 81 and the relay coil L11 is energized to turn on the relay contact 87. Accordingly, the charging power is supplied to the battery pack 20 side.

On the other hand, when anomaly occurs to the control unit 7 and the watchdog pulses from the control unit 7 are not inputted normally to the watchdog timer IC 81, the FET 86 is turned off in the watchdog timer IC 81 and no electric current flows through the relay coil L11. As a result, the relay contact 87 is turned off. Output of the charging power from the converter 3 to the battery pack 20 side is forcibly interrupted.

With respect to the battery pack 73 of the second embodiment as well, the watchdog timer IC 72 may be configured as the watchdog timer IC 81 of FIG. 7, and the charging permitting/stopping circuit 53 may be configured as the charging permitting/stopping circuit 82 of FIG. 7.

In an example shown in FIG. 7, the charging permitting/stopping circuit 82 is provided on the current-carrying path on the output side of the converter 3. However, the charging permitting/stopping circuit 82 may be provided on the current-carrying path on the input side of the converter 3 so as to urge/interrupt input of an external power to the converter 3 (input to the transformer T1).

Not only the charging permitting/stopping circuit 5 shown in the first embodiment is provided inside the charger, but also the charging permitting/stopping circuit 82 shown in FIG. 7 may be provided inside the charger. In this manner, at the time of anomaly of the control unit 7, not only the on/off control of the switching FET 31 by the switching IC 4 is forcibly invalidated to turn off the switching FET 31, but also a so-called current-carrying path for charging power leading from the cigarette lighter plug 15 to the positive side charging terminal 36 via the converter 3 can be interrupted. Forcible termination of the battery charging can be much ensured.

Also, in the charging system 50 of the above described second embodiment, the second reset signal outputted from the watchdog timer IC 8 of the charger 60 is inputted only to the charging permitting/stopping circuit 65 of the charger

Figure 8:
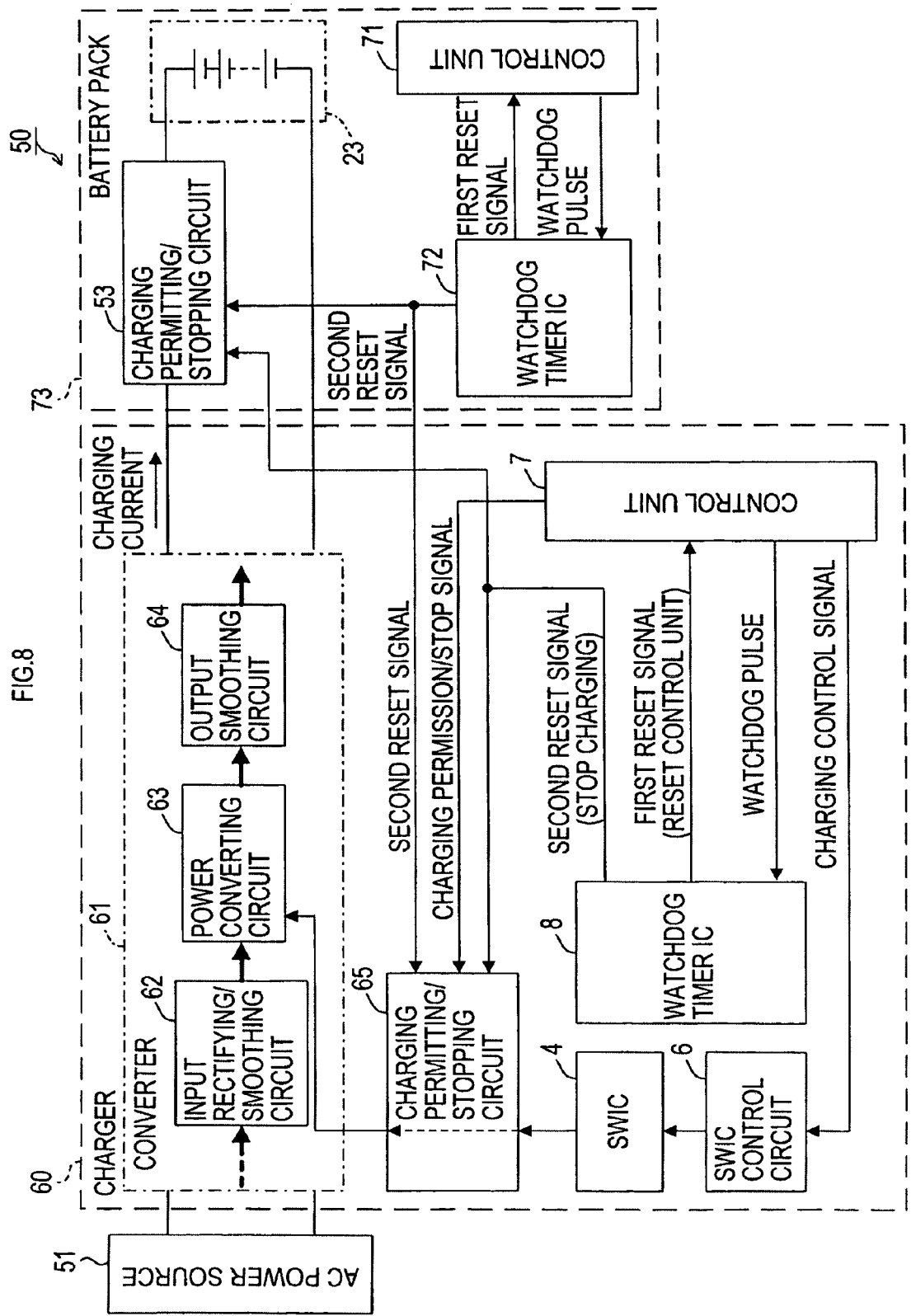
FIG. 8 is a block diagram showing a variation of the charging system of the second embodiment.

60. However, the second reset signal outputted from the watchdog timer IC 8 may be inputted to the charging permitting/stopping circuit 53 of the battery pack 73, as shown in FIG. 8.

In the charging system 50 configured as above, when it is determined by the watchdog timer IC 8 that the control unit 7 of the charger 60 is not operating normally, not only the output of the charging power from the charger 60 is stopped but also the current-carrying path from the converter 61 of the charger 60 to the rechargeable battery 23 of the battery pack 73 is interrupted.

In other words, when the control unit 7 of the charger 60 is not operating normally, the output of the charging power to the rechargeable battery 23 can be reliably stopped. Possibility that a trouble may occur to the rechargeable battery 23 can be all the more reduced.

What is claimed is:

1. A charging system comprising:
a battery pack having a rechargeable battery; and
a charging apparatus that is configured to charge the rechargeable battery, wherein
the battery pack comprises:
a battery-side main control unit that is configured to monitor a state of the rechargeable battery, while outputting a state signal which indicates an operation state of the battery-side main control unit;
a battery-side monitoring unit that is configured to determine whether or not the operation state of the battery-side main control unit is a predesignated specified operation state based on the state signal outputted from the battery-side main control unit; and
a battery-side signal output unit that is configured to output to the charging apparatus a stop request signal that requests a stop of charging to the rechargeable battery when it is determined by the battery-side monitoring unit that the operation state of the battery-side main control unit is the specified operation state, and
the charging apparatus comprises:
a power converting unit that is configured to convert an externally supplied external power to a charging power for charging the rechargeable battery and to output the converted charging power;
a conversion control unit that is configured to output a control signal to the power converting unit to control conversion from the external power to the charging power performed by the power converting unit; and
a charging-side stop unit that is configured to stop an operation of the power converting unit by deactivating the control signal outputted from the conversion control unit in receipt of the stop request signal from the battery pack.

2. The charging system according to claim 1, wherein the battery pack further comprises a battery-side stop unit that is configured to stop charging to the rechargeable battery when it is determined by the battery-side monitoring unit that the operation state of the battery-side main control unit is the specified operation state.

3. The charging system according to claim 2, wherein the battery-side stop unit is further configured to interrupt the charging power outputted from the charging apparatus to the battery pack, when it is determined by the battery-side monitoring unit that the operation state of the battery-side main control unit is the specified operation state.

4. The charging system according to claim 1, wherein the battery charger further comprises:
a charging-side main control unit that is configured to output a charging permission/stop signal which selectively indicates one of permission and stop of output of the charging power from the power converting unit, and a state signal which indicates an operation state of the charging-side main control unit; and
a charging-side monitoring unit that is configured to determine whether or not the operation state of the charging-side main control unit is a predesignated specified operation state based on the state signal outputted from the charging-side main control unit; and
the charging-side stop unit is further configured to stop the operation of the power converting unit by deactivating the control signal outputted from the conversion control unit when the charging permission/stop signal indicates the stop of the output of the charging power, while stopping the operation of the power converting unit by deactivating the control signal outputted from the conversion control unit when it is determined by the charging-side monitoring unit that the operation state of the charging-side main control unit is the specified operation state.

5. The charging system according to claim 4, wherein the charging apparatus further comprises a charging-side signal output unit that is configured to output to the battery pack a stop request signal that requests a stop of charging to the rechargeable battery, when it is determined by the charging-side monitoring unit that the operation state of the charging-side main control unit is the specified operation state, and
the battery pack further comprises an interruption unit that is configured to interrupt the charging power outputted from the charging apparatus in receipt of the stop request signal from the charging apparatus.

* * * * *